Nov. 11, 1958     J. V. BOUYOUCOS ET AL     2,859,726
ACOUSTIC-VIBRATION COUPLER
Original Filed June 24, 1954     4 Sheets-Sheet 1

*INVENTORS*
JOHN V. BOUYOUCOS
FREDERICK V. HUNT
BY Rines and Rines
ATTORNEYS

INVENTORS
JOHN V. BOUYOUCOS
FREDERICK V. HUNT
BY
Rines and Rines
ATTORNEYS

INVENTOR.
JOHN V. BOUYOUCOS
FREDERICK V. HUNT
BY Rines and Rines
ATTORNEYS

2,859,726

ACOUSTIC-VIBRATION COUPLER

John V. Bouyoucos, Cambridge, and Frederick V. Hunt, Belmont, Mass.

Original application June 24, 1954, Serial No. 439,085, now Patent No. 2,792,804, dated May 21, 1957. Divided and this application May 15, 1957, Serial No. 659,231

20 Claims. (Cl. 116—137)

The present invention relates to acoustic-vibration couplers, this application being a division of co-pending application, Serial No. 439,085, filed June 24, 1954, for Acoustic-Vibration Generator and Method, issued as United States Letters Patent No. 2,792,804, on May 21, 1957.

In the said co-pending application, there is described an acoustic generator, oscillator or transmitter that operates by virtue of acoustic feed-back applied to a fluid-pressure-actuated valving mechanism. Such a valving mechanism may be made to act periodically to modulate an otherwise uniform flow of a fluid medium and in so doing originate pressure variations, these arising from the alternate fluid accelerations and decelerations accompanying the modulatory process. These pressure variations may then be transmitted by an acoustic feed-back path to the place where they can react in such phase and magnitude as to control and sustain the valving action, thereby producing a pulsating flow of the fluid medium for generating acoustic vibrations.

As is more fully pointed out hereinafter, there are serious practical limitations, including considerations of necessary dimensions and efficiency, inherent in using prior-art diaphragms, pistons and similar coupling devices in conjunction with such acoustic-vibration apparatus. An object of the present invention, accordingly, is to provide a new and improved coupler for permitting the interchange of acoustic energy between such generator, oscillator or transmitter apparatus and a medium, such as, for example, a further fluid, disposed external to the generator, oscillator or transmitter.

A further object is to provide a novel flexible-walled coupler.

Other and further objects will be explained hereinafter and will be more particularly pointed out in the appended claims.

Figure 2:
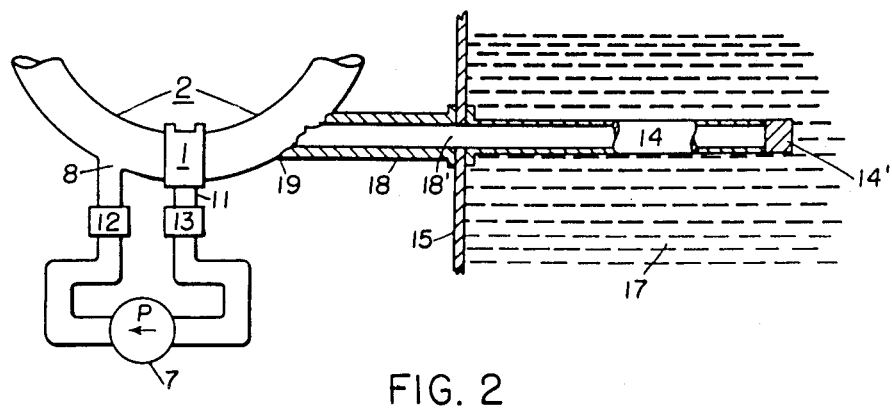
Figure 3:
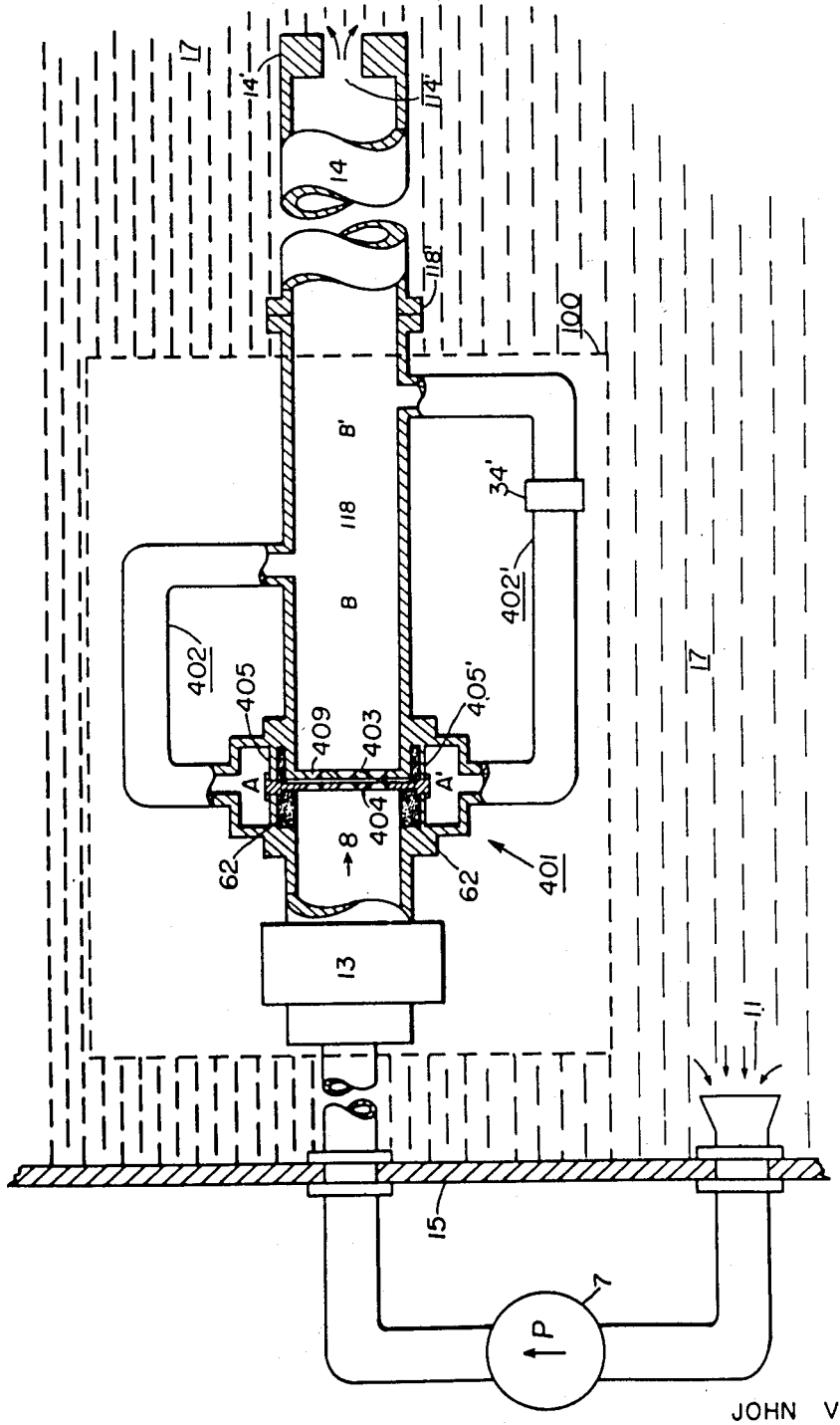
Figure 4:
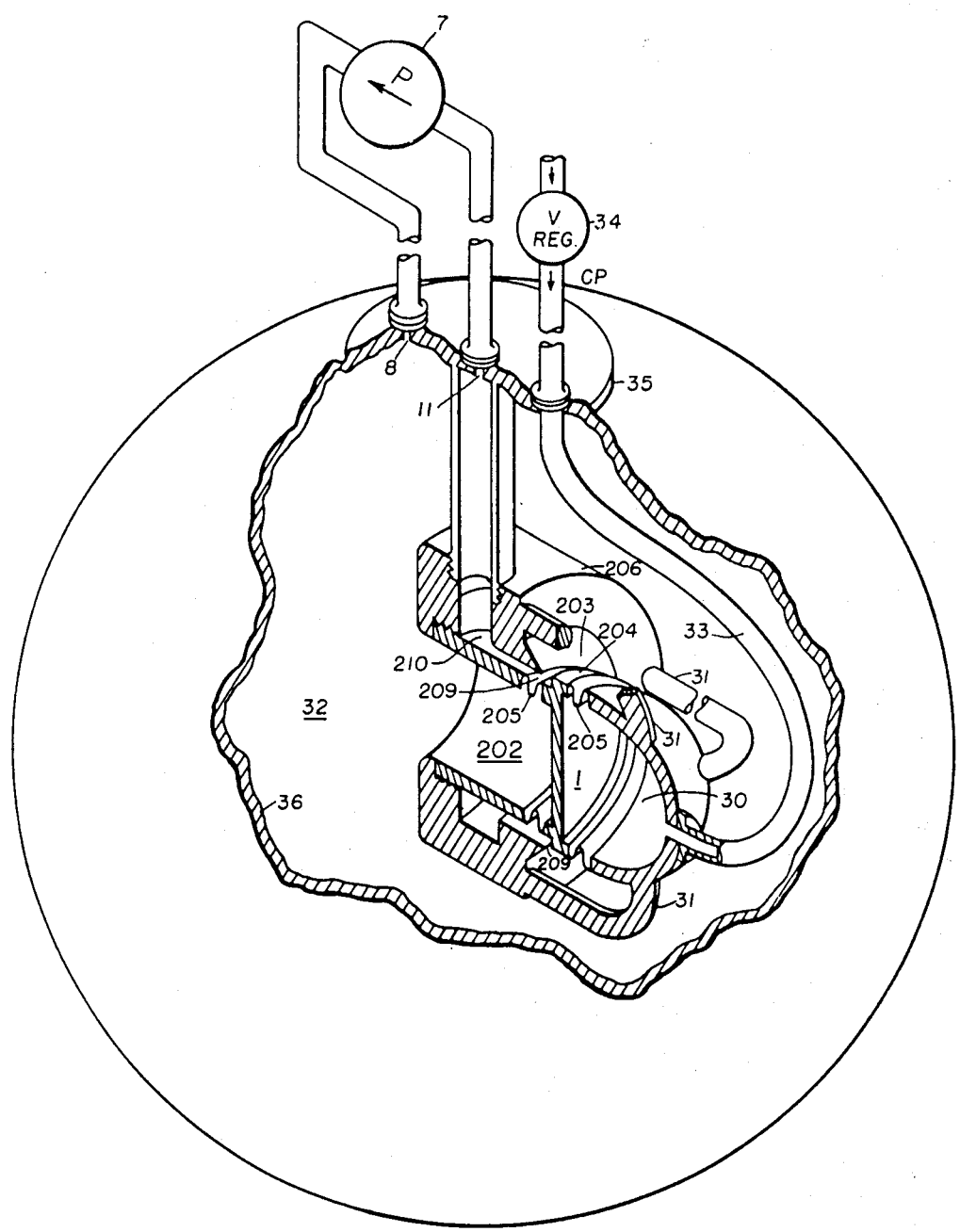
Figure 5:
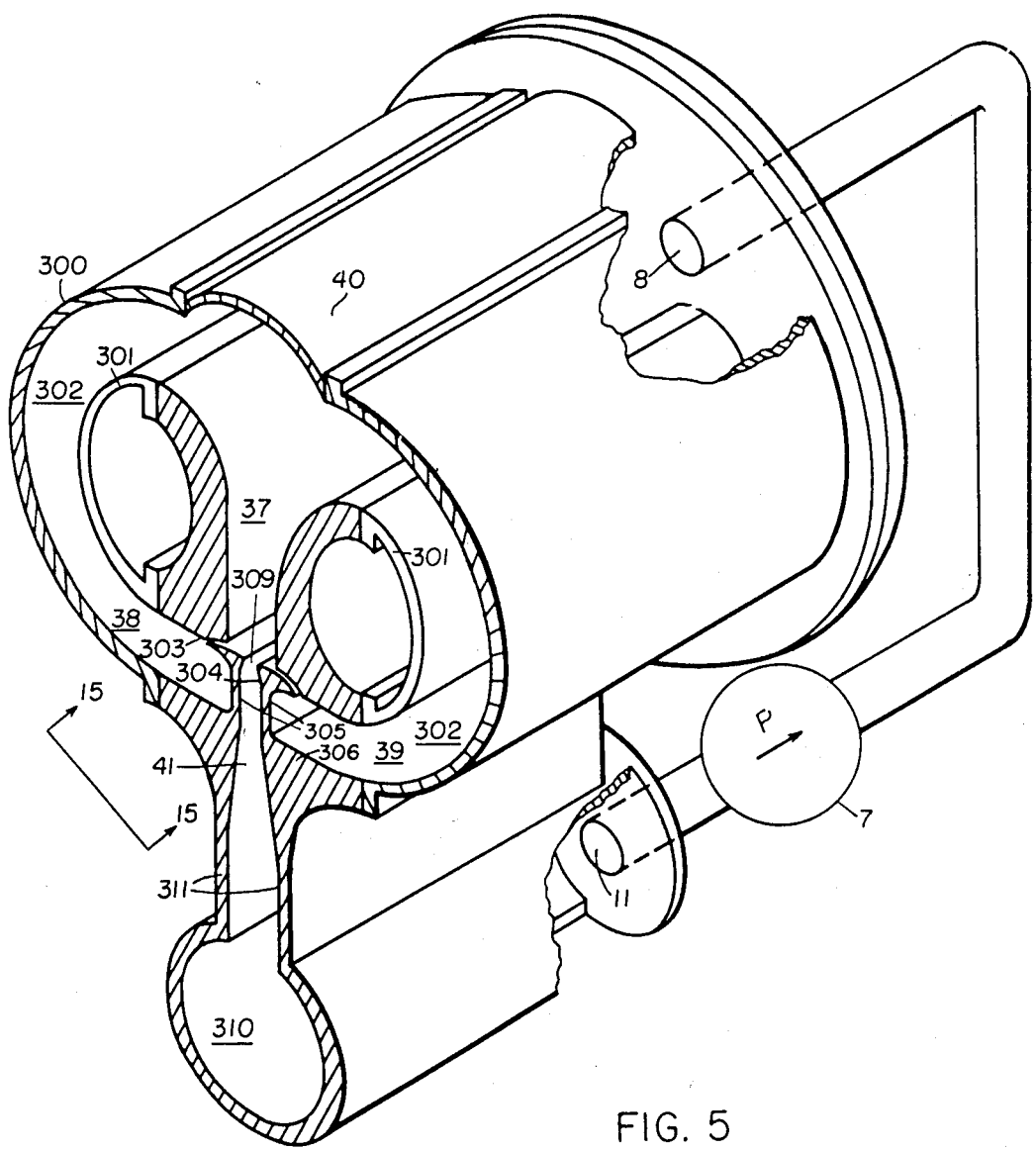

The invention will now be described in connection with the accompanying drawing, Fig. 1 of which is a fragmentary elevation, partly in section, illustrating a coupler constructed and connected in accordance with the present invention;

Figs. 2 and 3 are similar views of modifications, Fig. 3 being drawn upon an enlarged scale; and Figs. 4 and 5 are perspective views, partially broken away, illustrating still further modified coupling devices.

Figure 1:
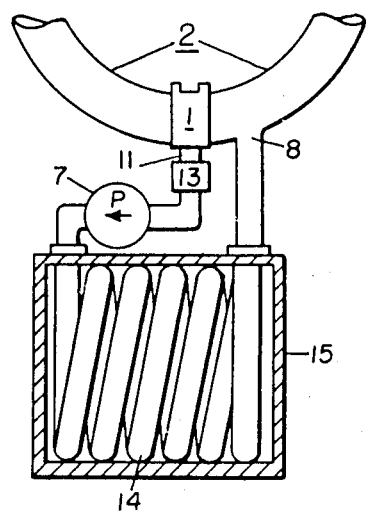

The acoustic pulsations or vibrations generated by an oscillator of the above-described nature, or by other types of fluid-operated acoustic-vibration generators, may, as described in the copending application, be coupled out or conveyed to a load by a flexible-walled tubular member, illustrated in Fig. 1 as a helically wound flexible hose 14. Since the details of the oscillator 2 with its valve mechanism 1 form no part of the present invention and are fully set forth in the said copending application, they are but fragmentarily illustrated in Fig. 1. Suffice it to state, for present purposes, that direct-current fluid flow from a pump 7 is converted into an acoustically pulsating fluid flow in the oscillator housing 2. The outlet 11 of the valve mechanism 1 is shown connected through a pulsation-absorbing filter 13 and the pump 7 to the left-hand open end of the helically wound hose 14. The right-hand open end of the hose 14 is connected to the fluid inlet 8 to complete the hydraulic circuit. Acoustic vibrations accompanying the pulsating fluid flow through the generator 2 will thus be conducted or propagated along the flexible member 14 as the fluid passes therethrough. The flexible-walled member 14 is preferably constituted of rubber or a similar flexible material to permit, through flexible movement of its walls, the transfer of the acoustic pulsations into, for example, an external tank 15. The tank 15, may, of course, be much larger than shown, in relation to the oscillator 2, and it may contain any desired fluid or other medium into which it is desired to transfer acoustic vibrations. Acoustic vibratory energy transmitted backward through the inlet 8 to the flexible wall hose 14 will thus be dissipated therein by transfer through the flexible walls of the hose 14 into the tank 15.

It is by no means necessary, though, that the load device 14 be disposed between the pump 7 and the inlet 8, as shown in Fig. 1. The load device may, in fact, be connected, as described in the said copending application, to any desired portion of the loop 2. Filters 12 and 13 may then be utilized in both the inlet 8 and outlet 11 to isolate the acoustic circuit of the oscillator 1—2 from the hydraulic supply pump 7 as illustrated in Fig. 2. The acoustic power generated by the oscillator of Fig. 2 is shown extracted by a conduit 18 tapped into the oscillator loop 2 at an intermediate point 19 thereof. The conduit 18 leads to the wall 15 bounding a fluid medium 17 and is coupled through an aperture 18' in the wall 15 to a longitudinal section of flexible-walled tubular hose 14 that extends longitudinally into the fluid medium 17. The hose 14 is shown terminated or closed at 14' so that it contains the fluid from the oscillator loop 2. The oscillatory fluid pressure existing at the point 19 of the loop 2 will give rise to acoustic-vibration pressure waves that travel or propagate through the conduit 18 along the interior of the hose 14, the flexible walls of which will dilate and contract radially in those regions where the internal pressure is elevated or depressed by the oscillatory pressure waves transmitted therein. The dilations and contractions of the hose 14 give rise, of course, to corresponding radial motions of the external surfaces of 14, and these motions, in turn, will generate compressional acoustic waves in the medium 17 surrounding the hose 14. Acoustic energy is thus transferred or coupled from the oscillator 1—2 into the medium 17.

In the case of a flexible-walled tubular hose 14 that is very long compared to the wavelength of the generated acoustic energy, the acoustic-energy radiation pattern of the hose 14 may be quite directional and of the end-fire type, having a major lobe that substantially coincides with the longitudinal axis of the straight hose 14. In general, the width of the directivity pattern of such a hose 14 depends primarily upon the ratio of the velocity of the pressure wave within the hose 14 to the velocity of free acoustic waves in the medium 17, high directivity being achieved when this ratio approaches unity. The directivity pattern and the axial rate of acoustic energy transfer from the hose 14 to the medium 17 are thus dependent upon the characteristics of the media both within and without the hose 14 and also upon the properties of the material from which the hose 14 is fabricated. It is thus possible with the aid of a load 14 of this character to couple high power from the oscillator 1—2 and to transmit such high power with high directivity without resorting to diaphragms or pistons whose physical dimensions would need to be many times the acoustic wavelength in order to produce a corresponding directional gain. In addition, the oscillator 1—2 itself may have an outlet 18 that, unlike prior-art diaphragms and piston sources of acoustic energy, has dimensions that may be considerably less, instead of many times, the acoustic-energy wavelength.

In the systems of Figs. 1 and 2, as in the other embodiments of the invention hereinafter described, it is to be understood that while a particular load configuration or use for the energy may be described in connection with any particular figure, this is illustrative only, and such load configuration or use may equally well be adapted to the systems of the other figures. Typical uses for the acoustic energy include, for example, the agitation or processing of fluid and other media, and the production of acoustic signals for communication or object detection. If desired, moreover, a fluid to be processed may indeed be pumped from the pump 7 through the oscillator 1—2 itself, serving as the fluid for the oscillator.

We have successfully operated an oscillator of the character illustrated in Figs. 1 and 2, for example, at oscillation frequencies ranging from 550 to 700 cycles per second with static fluid pressures from the pump 7 of from 20 to 50 lbs. per square inch. The loop 2 was made of copper tubing having a wall thickness of about 0.1 cm., a cross-sectional diameter of about 1.5 cm. and a loop-length of about 75 cm. The ratio of the length of the loop 2 to the wavelength of the oscillations ranged from about 0.3 to about 0.4. The oscillation frequency was, in some tests, below the mechanical resonant frequency of the wave assembly 1, which was about 1000 cycles per second. The fluid employed was water and the velocity of sound in the water-filled loop 2 as modified by the finite elasticity of the loop wall was about $1.3 \times 10^5$ cm. per second. The direct-current flow power input from the pump 7 was from 4 to 8 watts, and the circulating or reactive acoustic-oscillation power in the loop 2 of this particular relatively low-power oscillator was estimated to be several watts prior to connection to the flexible-walled coupler hose 14. As before indicated, for some purposes, a resonant system is desired in which case the effective acoustical length of the flexible tubular member 14 may be any integer multiple of the quarter-wavelength of the acoustic-vibration waves; whereas for other purposes, as previously explained, the flexible member 14 may extend from the oscillator 2 many wavelengths of the acoustic-vibration waves.

In Fig. 3, the flexible-walled coupler 14 is shown cooperating with a somewhat modified oscillator 2, included within the dotted lines 100, being joined thereto by means of flanges 118'. The modified hose 14 of Fig. 3, however, is open at its terminal cap 14', as illustrated at 114'. The combined assembly is shown submerged within a fluid medium 17, separated by a bulkhead 15 from the supply pump 7. Pump 7 obtains its hydraulic supply from the medium 17 by means of the inlet 11, and delivers the fluid through the low-pass acoustic filter 13 to the inlet 8 of the oscillator. The fluid passes through multiple orifices 409, later described, and into and through a conduit 118 and the flexible walled hose 14, finally to discharge into the medium 17 through the opening 114' in the end cap 14'. By controlling the size of the opening 114', the average pressure within conduit 118 and the hose 14 may be elevated above that of the surrounding medium 17. Since the peak negative pressure variation is limited by the absolute magnitude of the average pressure, in this way greater internal pressure variations accompanied by increased acoustic energy densities are allowed. The details of operation of this oscillator are set forth in the said copending application so that they need not be repeated here. The supply flow from the pump 7 is modulated at the valve assembly 401 by a periodic motion of the valve 404, giving rise to variational accelerations of the fluid flux from the orifices 409 into the conduit 118. This modulatory action upon the flow acts as an equivalent acoustic volume velocity source to generate progressive acoustic-vibration waves that travel down the conduit 118 and into the flexible walled hose 14, therein to be dissipated as previously described. The mode of operation of the oscillator of Fig. 3 will not be fundamentally changed if all the energy of the outward-progressing wave is not completely transferred to the medium 17 in a single transit through the hose 14, so that reflection occurs at the termination 114' and a standing wave system is thereby established in the conduits 118 and 14.

While the coupler of the present invention is preferably of tubular form, it may, also, assume other curved surface configurations. The generator, oscillator or transmitter of Fig. 4, for example, is constructed to employ the radial or extensional motion of the external surfaces of a flexible elastic shell 36, as it compresses and expands, to impart acoustic energy stored in the oscillator to the medium surrounding the shell 36; or, if desired, other output coupling means may be used, as before discussed. The details of the operation of the oscillator of Fig. 4 are described in the said copending application; but, since the shell 36, the inner surface of which bounds the fluid medium of the oscillator, operates as a coupler for the acoustic vibrations that are generated, reptition of the mode of operation may be useful. Assuming that a steady flow has been established in the hydraulic circuit of Fig. 4, and that the valve mechanism 1 is caused to perform an incremental closure, the fluid flow through the orifice 209 is then throttled with the result that a pressure rise is established throughout the fluid contained in the cavity 32. This pressure rise produces both a compression of the fluid contained within the cavity 32, and an expansion or extension of the flexible shell wall 36 of the sphere, accompanied by a displacement of fluid into the hollow 202 of the block 206. An increase in the pressure upon the left-hand face of the valve disc 204 is thereby produced, causing the valve disc 204 to move to the right and away from the valve seat 203, thus increasing the area of the orifice 209. This, in turn, allows more fluid to discharge through the chamber 210 and the outlet 11, reducing the pressure across the orifice 209. Accompanying the reduced pressure associated with this increased discharge rate will be an expansion of the fluid within the cavity 32 and a contraction of the shell wall 36, thus releasing fluid from the hollow 202 of the block 206 and thereby reducing the pressure on the left-hand face of the valve disc 204 and allowing the orifice 209 to close again. The resulting decrease in orifice discharge produces a rise in the pressure in the fluid of the cavity 32 again, and so on. It is thus evident that, as in the case of the system of Fig. 1, pressure fluctuations are fed back through the transmission path provided by the members 202 and 32, in just such a way as to sustain self-excitation of the oscillator. This acoustic oscillation, moreover, will occur at a frequency at which the effective acoustic compliance of the shell wall 36 lumped in parallel with the compliance of the fluid contained therein resonates with the series impedance of the mass of the fluid contained within the hollow 202 and the acoustical compliance of the suspension of the valve mechanism 1. For the specific oscillator of Fig. 4, this frequency must be low enough for the equivalent wavelength of pressure waves in the fluid enclosed within the shell 36 to be at least as large or larger than the diameter of the flexible shell 36.

For purposes of providing still another illustration of a somewhat different type of acoustic-energy coupling device, the cantilever-beam valve-structure oscillator of Fig. 5, which is fully explained in the said copending application and need not be further elaborated upon herein, is shown having its pulsating fluid medium bounded by an elastic cylindrical coupler surface or window 40 in the wall of the chamber 300. The motion of this elastic surface in response to pressure variations in the central region 37, permits acoustic energy to be radiated from the oscillator into a surrounding medium in which the assembly of Fig. 5 may be immersed.

Further modifications will occur to those skilled in the art and all such are considered to fall within the spirit and scope of the invention as defined in the appended claims.

What is claimed is:

1. In an acoustic generator system in which acoustic vibrations are propagated within a fluid medium, an acoustic-vibration output coupling device comprising a flexible-walled tubular member connected to receive the fluid medium, both ends of the tubular member being open to permit passage therethrough of the fluid medium.

2. In an acoustic generator system in which acoustic vibrations are propagated within a fluid medium, an acoustic-vibration output coupling device comprising a flexible-walled tubular member connected to receive the fluid medium, the flexible-walled tubular member being helically wound.

3. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system.

4. In an acoustic system in which acoustic vibrations are propagated within a fluid medium, an acoustic-vibration output coupling device for transferring acoustic energy from the system to a further medium, that comprises a longitudinally extending flexible-walled tubular member having an open end for receiving the fluid medium from the system.

5. In an acoustic system in which acoustic vibrations are propagated within a fluid medium, an acoustic-vibration output coupling device for transferring acoustic energy from the system to a further medium, that comprises a curved flexible-walled tubular member having an open end for receiving the fluid medium from the system.

6. In an acoustic system in which acoustic vibrations are propagated within a fluid medium, an acoustic-vibration output coupling device for transferring acoustic energy from the system to a further medium, that comprises a helically wound flexible-walled tubular member having an open end for receiving the fluid medium from the system.

7. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system and of length substantially a multiple of the quarter-wavelength of the acoustic vibrations.

8. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system and of length long compared to the wavelength of the acoustic vibrations.

9. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system and closed at the other end.

10. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system and closed at the other end and of length substantially a multiple of the quarter-wavelength of the acoustic vibrations.

11. In an acoustic system in which acoustic vibrations are propagated within a fluid medium, an acoustic-vibration output coupling device for transferring acoustic energy from the system to a further medium, that comprises a flexible-walled tubular member having an open end for receiving the fluid medium from the system and closed at the other end and of length long compared to the wavelength of the acoustic vibrations.

12. In an acoustic system in which acoustic vibrations are propagated within a fluid medium, an acoustic-vibration output coupling device for transferring acoustic energy from the system to a further medium, that comprises a flexible-walled tubular member open at both its ends to permit passage of the fluid therethrough.

13. In an acoustic system in which acoustic vibrations are propagated within a fluid medium, an acoustic-vibration output coupling device for transferring acoustic energy from the system to a further medium, that comprises a flexible-walled tubular member open at both its ends to permit passage of the fluid therethrough and of length substantially a multiple of the half-wavelength of the acoustic vibrations.

14. In an acoustic system in which acoustic vibrations are propagated within a fluid medium, an acoustic-vibration output coupling device for transferring acoustic energy from the system to a further medium, that comprises a flexible-walled tubular member open at both its ends to permit passage of the fluid therethrough and of length long compared to the wavelength of the acoustic vibrations.

15. In an acoustic system in which acoustic vibrations are propagated within a fluid medium, an acoustic-vibration output coupling device for transferring acoustic energy from the system to a further medium, that comprises a flexible-walled member curved in cross-section and bounding along its inner surface at least part of the fluid medium.

16. In an acoustic system in which acoustic vibrations are propagated within a fluid medium, an acoustic-vibration output coupling device for transferring acoustic energy from the system to a further medium, that comprises a flexible substantially cylindrical-wall member bounding along its inner surface at least part of the fluid medium.

17. In an acoustic system in which acoustic vibrations are propagated within a fluid medium, an acoustic-vibration output coupling device for transferring acoustic energy from the system to a further medium, that comprises a flexible substantially spherical-wall member bounding along its inner surface at least part of the fluid medium.

18. In an acoustic system in which acoustic vibrations are propagated within an acoustic-vibration transmitter, a flexible-walled tubular acoustic-vibration conducting device connected at one end to the transmitter to receive the fluid medium therefrom, the tubular device extending outward away from the transmitter a distance large compared to the wavelength of the acoustic vibrations.

19. In an acoustic system in which acoustic vibrations are propagated within an acoustic-vibration transmitter, a flexible-walled tubular acoustic-vibration conducting device connected at one end to the transmitter to receive the fluid medium therefrom, the tubular device extending outward away from the transmitter into a further fluid medium a distance large compared to the wavelength of the acoustic vibrations, thereby to transmit the acoustic vibrations propagated along the tubular device into the further fluid medium.

20. An acoustic system as claimed in claim 19 and in which the tubular walls are constituted of material such that the ratio of the velocity of the acoustic vibrations within the tubular device to the velocity of free acoustic vibrations in the further fluid medium approaches unity.

References Cited in the file of this patent

UNITED STATES PATENTS 2,792,804     Bouyoucos _____ May 21, 1957